Figure 1:
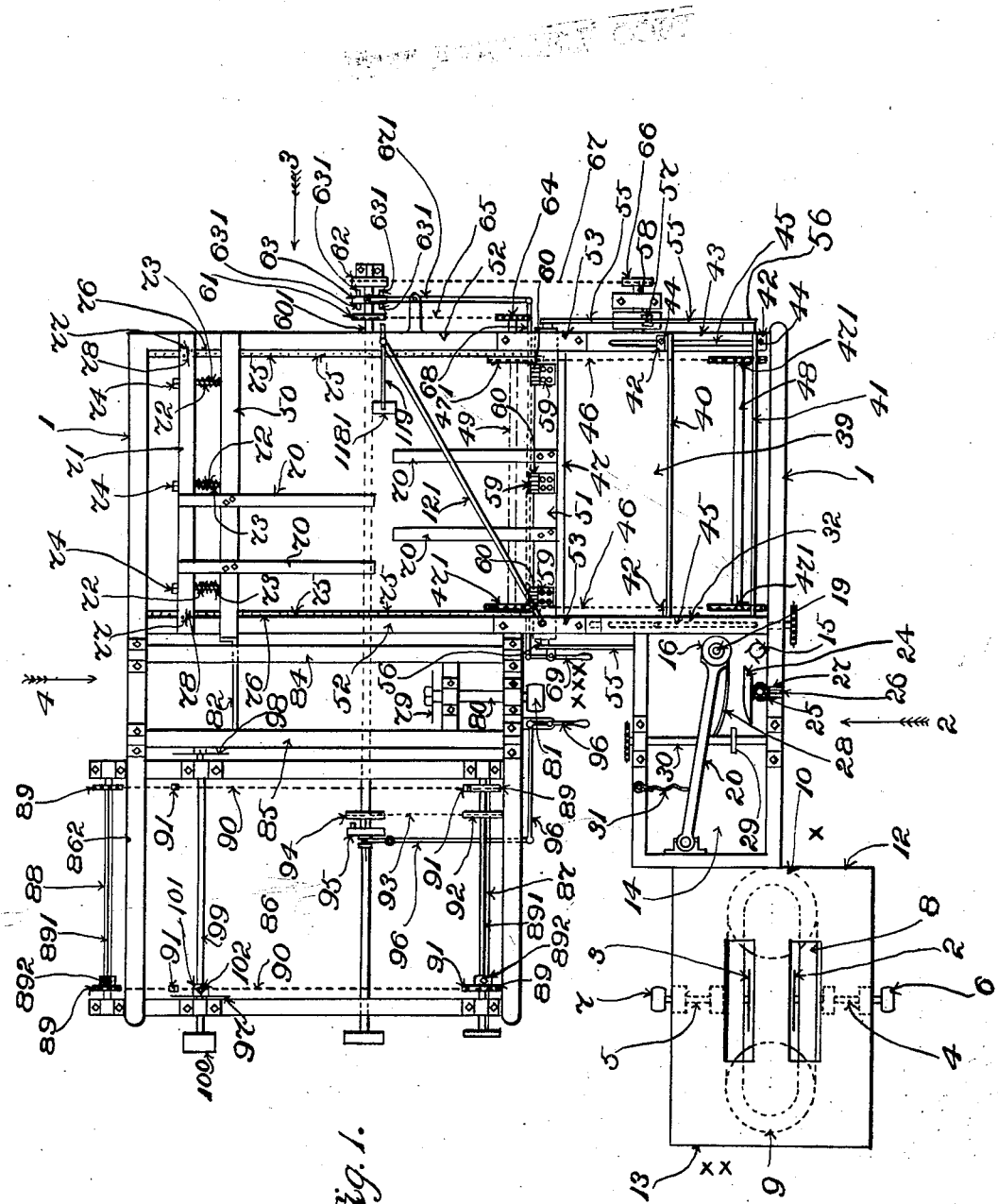

No. 725,930. PATENTED APR. 21, 1903.
F. P. CHENEY.
MACHINE FOR MAKING SIDES FOR PACKING CASES.
APPLICATION FILED NOV. 29, 1898.
NO MODEL. 7 SHEETS—SHEET 1.

Witnesses:
Oscar F. Hill
Lepine Hall Rice

Inventor
Frank P. Cheney
by Macleod Calvert & Randall
his Attorneys.

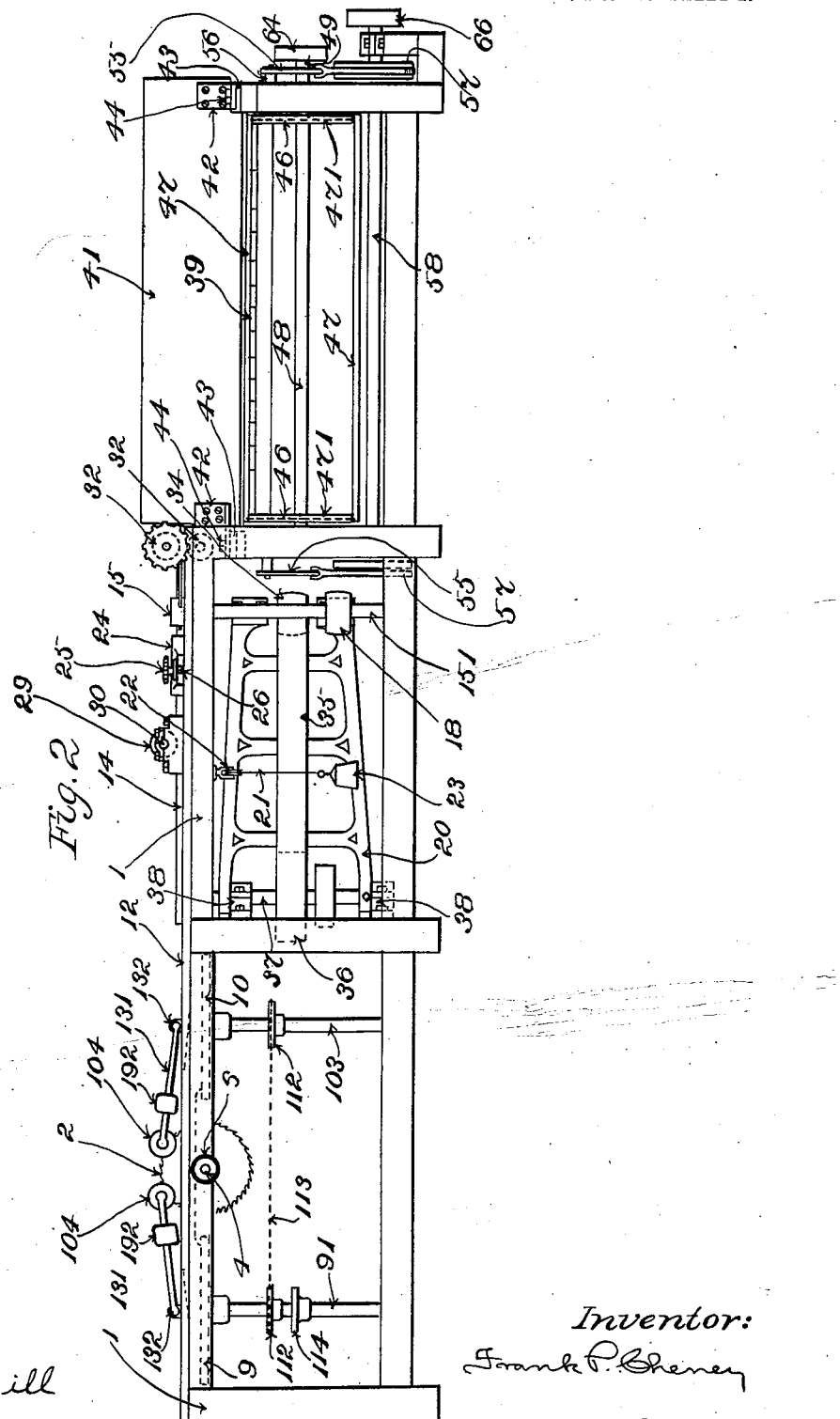

No. 725,930. PATENTED APR. 21, 1903.
F. P. CHENEY.
MACHINE FOR MAKING SIDES FOR PACKING CASES.
APPLICATION FILED NOV. 29, 1898.
NO MODEL. 7 SHEETS—SHEET 3.
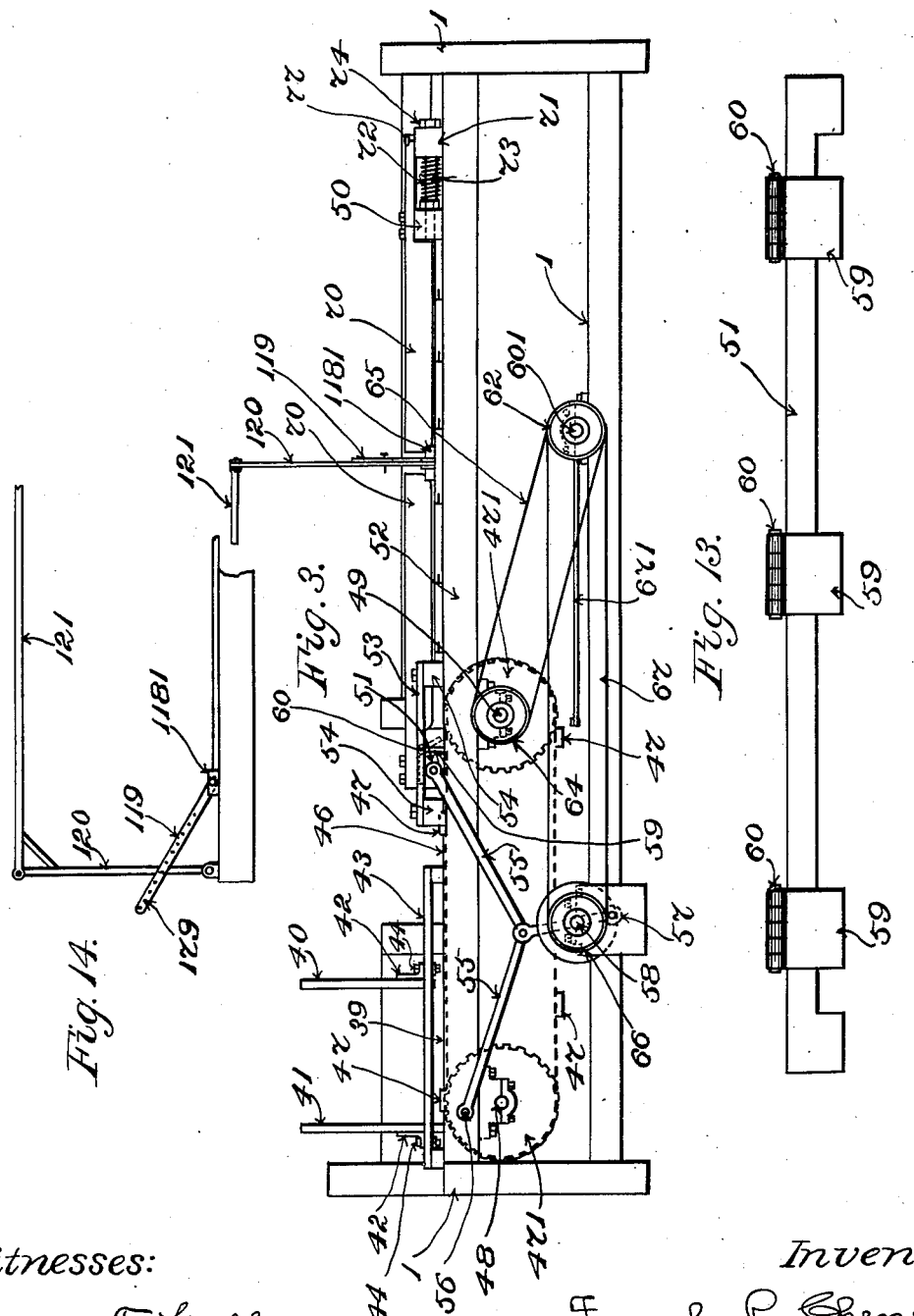
Witnesses:
Oscar F. Hill
Lepine Hall Rice
Inventor:
Frank P. Cheney
By Macleod Calver & Randall
his Attorneys.

No. 725,930. PATENTED APR. 21, 1903.
F. P. CHENEY.
MACHINE FOR MAKING SIDES FOR PACKING CASES.
APPLICATION FILED NOV. 29, 1898.
NO MODEL. 7 SHEETS—SHEET 4.
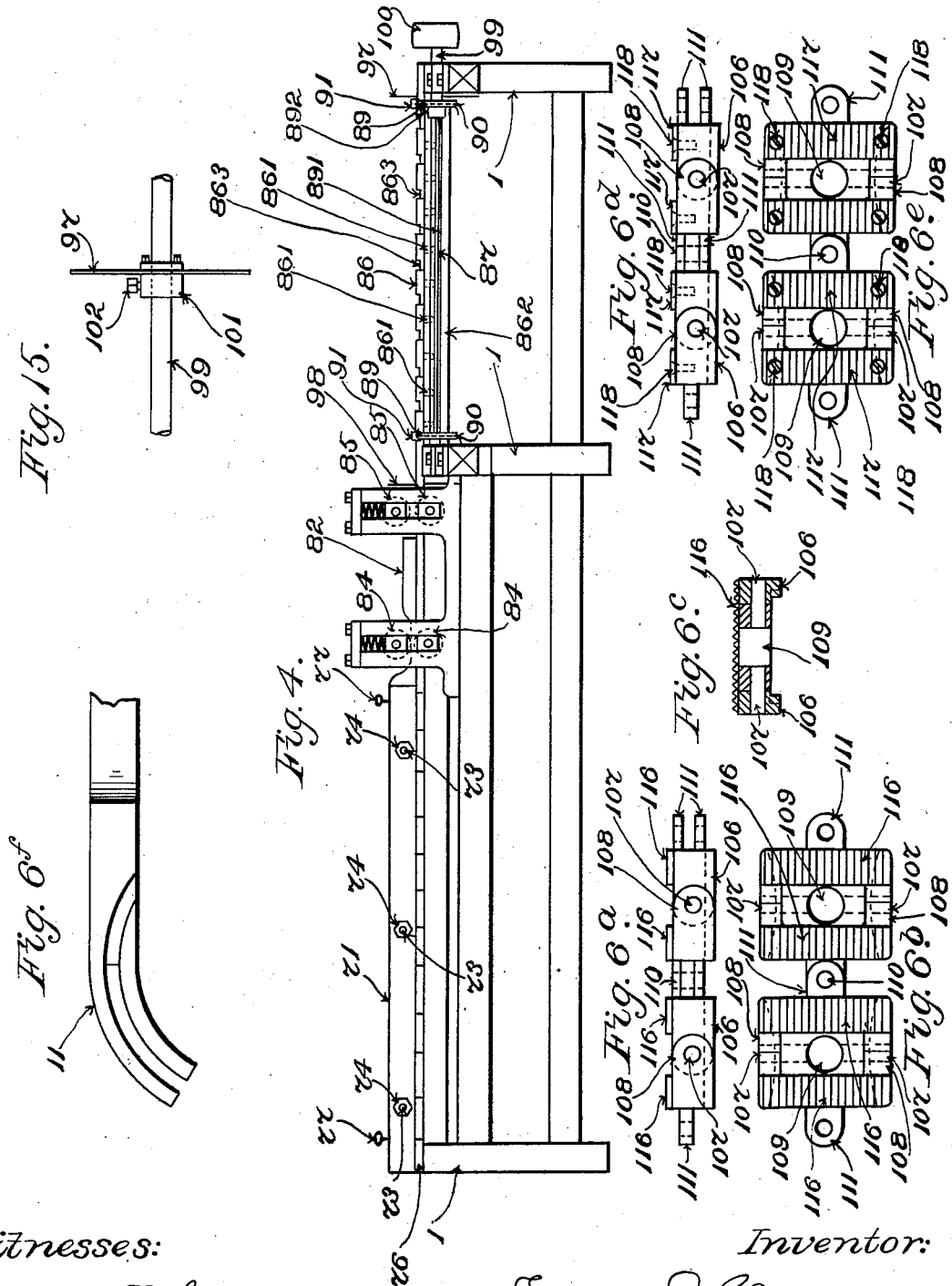
Witnesses:
Oscar F. Hill
Lepine Hall Rice
Inventor:
Frank P. Cheney
By Macleod Calver & Randall
his Attorneys.

No. 725,930. PATENTED APR. 21, 1903.
F. P. CHENEY.
MACHINE FOR MAKING SIDES FOR PACKING CASES.
APPLICATION FILED NOV. 29, 1898.
NO MODEL. 7 SHEETS—SHEET 5.
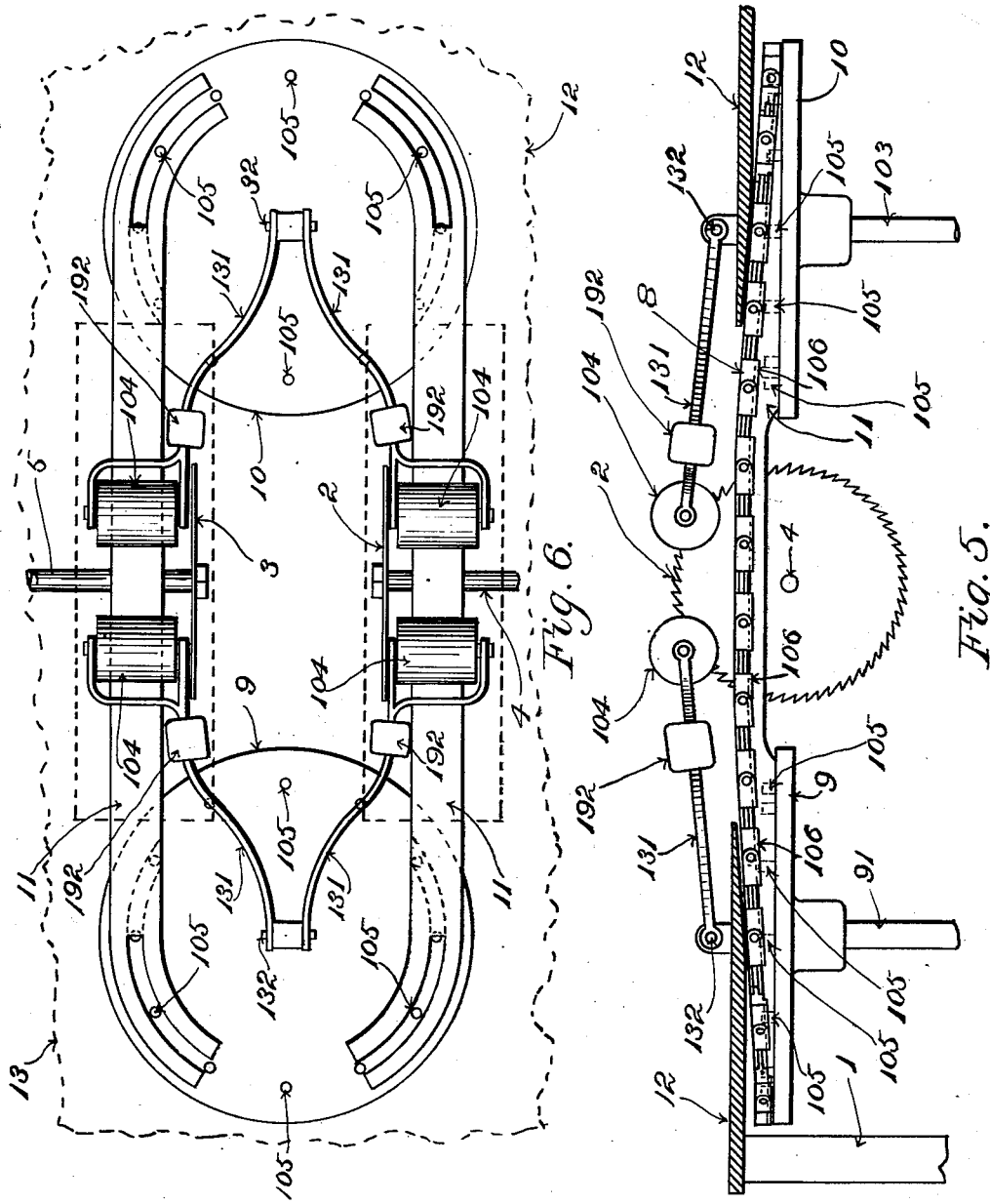
Witnesses:
Oscar F. Hill
Lopine Hall Rice
Inventor:
Frank P. Cheney
by Macleod Calver & Randall
his Attorneys.

No. 725,930. PATENTED APR. 21, 1903.
F. P. CHENEY.
MACHINE FOR MAKING SIDES FOR PACKING CASES.
APPLICATION FILED NOV. 29, 1898.
NO MODEL. 7 SHEETS—SHEET 6.
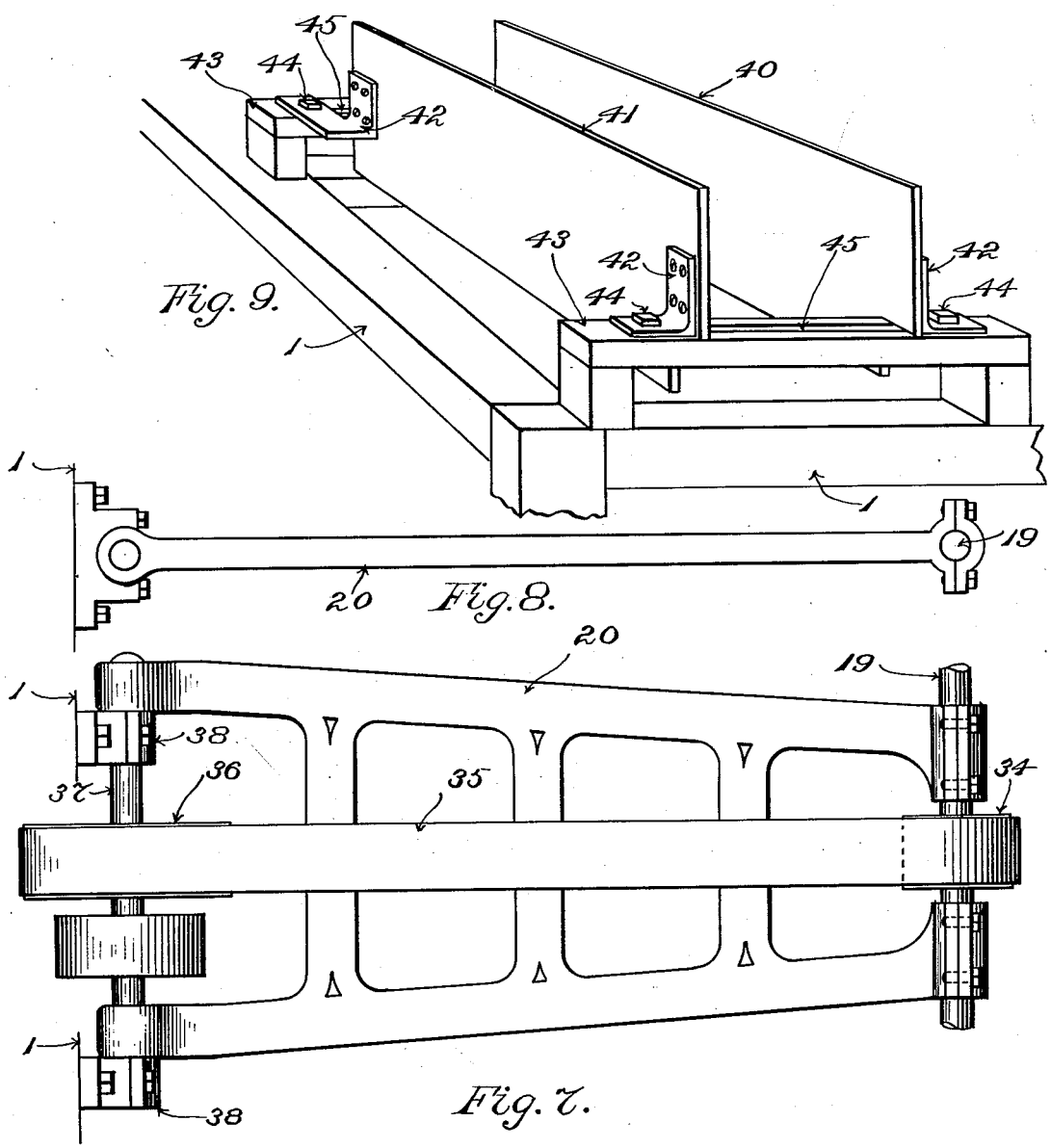
Witnesses:
Oscar F. Hill
Lepine Hall Rice
Inventor:
Frank P. Cheney
by Macleod Calver & Randall
his Attorneys.

No. 725,930. PATENTED APR. 21, 1903.
F. P. CHENEY.
MACHINE FOR MAKING SIDES FOR PACKING CASES.
APPLICATION FILED NOV. 29, 1898.
NO MODEL. 7 SHEETS—SHEET 7.

Witnesses:
Oscar F. Hill
Lopine Hall Rice

Inventor:
Frank P. Cheney
By Macleod Calver & Randall
his Attorneys:

UNITED STATES PATENT OFFICE.

FRANK P. CHENEY, OF LOWELL, MASSACHUSETTS.

MACHINE FOR MAKING SIDES FOR PACKING-CASES.

SPECIFICATION forming part of Letters Patent No. 725,930, dated April 21, 1903.

Application filed November 29, 1898. Serial No. 697,731. (No model.)

*To all whom it may concern:*

Be it known that I, FRANK P. CHENEY, a citizen of the United States, residing at Lowell, in the county of Middlesex and State of Massachusetts, have invented certain new and useful Improvements in Machines for Making Sides, &c., for Packing-Cases, of which the following is a specification, reference being had therein to the accompanying drawings.

My invention has for its chief object to provide an organized machine of convenient and practical character by means of which boards of the proper length to be used in the construction of box sides, box ends, or other like articles may have the rough and irregular edges thereof trimmed off, may then have their trimmed edges tongued and groved, may then be assembled together edge to edge until the proper width for the desired box side, box end, or other article is secured, and may then be compacted or driven together to cause the tongues to enter fully into the grooves, and after which the assembled boards may then be trimmed to exactly the required width and length of the completed article in readiness for use in the construction of a box or for some other desired purpose.

My invention has, further, among its objects to provide a machine which shall be largely automatic in the performance of its operations and shall enable an increased quantity of work to be performed by a smaller number of workmen, which also shall require the services of only a small number of attendants, and which shall also dispense very largely with manual handling of the boards.

The invention consists in the novel organized machine, which I will now proceed to describe with reference to the accompanying drawings, and in the novel combinations of parts and features of construction which are embodied in such machine, all as hereinafter explained and as particularly pointed out in the claims at the close of this specification.

The drawings show one embodiment of the invention, and in the same—

Figure 11:
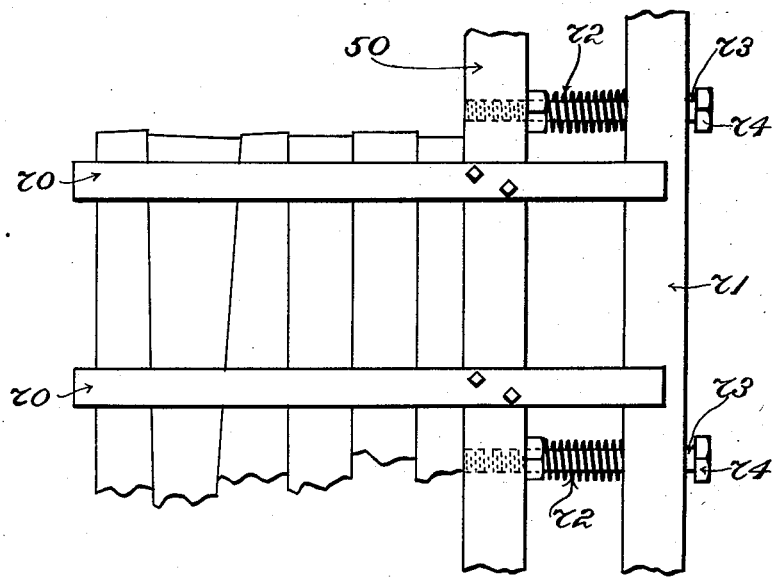
Figure 10:
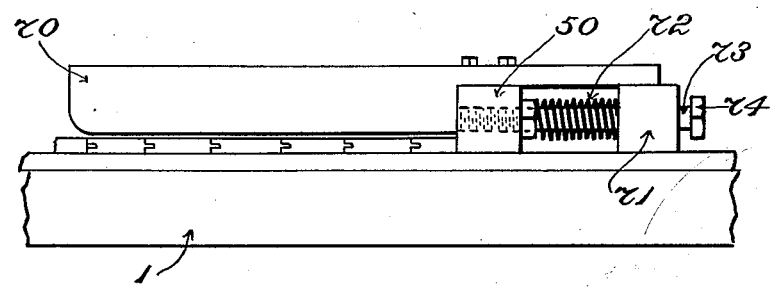
Figure 12:
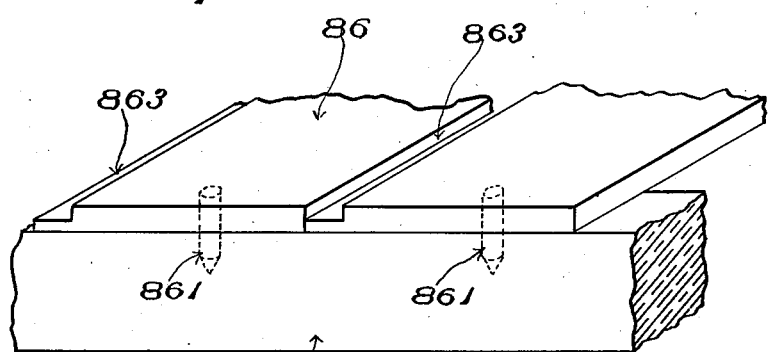

Figure 1 is a plan view of my machine, showing its general features and the relation thereof, but omitting many minor details of construction for the sake of clearness. Fig. 2 is a view in side elevation looking from the right-hand side of Fig. 1 in the direction that is indicated by arrow 2. Fig. 3 is a view in elevation looking from the top of Fig. 1 in the direction that is indicated by the arrow 3. Fig. 4 is a view in side elevation looking from the left-hand side of Fig. 1 in the direction that is indicated by the arrow 4. Fig. 5 is a view showing in side elevation certain portions of the edging mechanism. Fig. 6 is a view thereof in plan with the chain omitted. Figs. $6^a$, $6^b$, $6^c$, $6^d$, and $6^e$ are views showing details of the feed-chain for the edging mechanism. Fig. $6^f$ is a detail of one end of one of the guides or guideways for the feed-chain. Fig. 7 is a view showing in side elevation the swinging carrier for one of the matching-cutters. Fig. 8 shows the same in plan, the tables being omitted. Fig. 9 is a perspective of the guides at the receiving end of the assembling-table and the supports therefor. Fig. 10 shows in side elevation certain of the parts at one end of the assembling-table, including the yielding gage and the hold-down bars which are applied thereto. Fig. 11 is a view of a portion thereof in plan. Fig. 12 is a view showing more particularly the construction of the table on which the box side or the like is trimmed to length. Fig. 13 is a view in elevation of the driver-bar. Fig. 14 is a view showing more particularly the pusher mechanism. Fig. 15 shows one of the saws for trimming the box side to length and its adjustable collar.

1 designates the framework in general of the machine, the same being of suitable construction and arrangement for supporting the various working and other essential parts of the machine, including the various tables or platforms over which the boards are moved.

For the purpose of stripping or trimming off the rough and uneven edges which are on the boards as they come from the sawmill I employ edging devices or edgers of suitable character. The edging-saws 2 and 3, Figs. 1, 2, 5, and 6, are mounted, respectively, on the arbors or shafts 4 and 5, the latter being provided, respectively, with pulleys 6 and 7. To the said pulleys in practice are applied driving bands or belts, (not shown,) by means of which to rotate the said arbors or shafts 4 5 and the saws 2 3 mounted thereon. The two saws are located substantially opposite to each other and are rotated in opposite directions with reference to each other. 12 designates the table or platform of the first edger, and 13 designates the table or platform of the second edger. The edging or stripping is effected as follows: A workman stands at the point that is indicated by X in Fig. 1 and passes the rough-edged boards to the first edger, placing and guiding the said boards so as to enable the saw 2 to remove the strip from that edge of each board which is turned toward the right-hand side of the workman. A second workman stands at or about the point which is indicated by X X in Fig. 1. He will receive each board after it has been operated upon by the first edger, and he will then pass the same to the second edger, placing and guiding the board so that the remaining rough edge which it is desired shall be removed by the saw 3 shall be turned toward his right-hand side.

Preferably in practice the edgers will be provided with automatic means of feeding the boards past the saws 2 and 3. In the case of some embodiments of the general invention various arrangements of feed-rolls or of other known or suitable feeding devices may be employed. I have contrived, however, for use in connection with the saws 2 and 3 the special form of feeding devices which I will now proceed to describe with reference more especially to Figs. 1, 5, 6, and 6ᵃ to 6ᶠ. These feeding devices comprise, esentially, an endless chain 8, which is made up of links composed of feed-blocks, two wheels, herein constituted by disks 9 and 10, for the actuation of the feed-chain 8, shafts 91 and 103, on which said wheels or disks, respectively, are mounted, guides 11 11, which are arranged adjacent to and parallel with the respective saws 2 and 3, and presser-rolls 104 104 above the said guides. The guides 11 11 extend horizontally past the respective saws 2 and 3 and constitute supports and guideways, along which the feed-blocks move past the said saws. The said wheels or disks 9 and 10 are mounted, respectively, at opposite ends of the pair of guideways 11 11, the shafts 91 and 103 being placed in a line which is equidistant between the two guides. Each disk is overhung by the corresponding ends of the said pair of guides or guideways, the two guides or guideways standing on opposite sides of the center of the disk, as shown, and the said ends being curved so as to conform for a portion of their length to the curvature of the disk. Each disk is furnished with a series of upwardly-projecting pins or teeth 105 105, and the ends of the guides or guideways are grooved underneath and also slotted for a portion of their length at their curved extremities to provide for the passage of the said pins or teeth as the disks rotate, the under sides of the ends of the guideways being placed close to the upper surfaces of the disks. On their under sides the links or blocks composing the endless chain have downwardly-projecting flanges 106 106 at a distance apart which is sufficient to enable the guides or guideways 11 to be received between them, the said flanges preventing lateral displacement of the blocks while they are moving along the said guides or guideways. The links or blocks are connected together by horizontal hinges in pairs, these hinges being constituted by horizontal pins 107 107, applied to overlapping vertical lugs or ears 108 108, which are located at opposite sides of the blocks, a space 109 being left between the meeting ends of the said blocks and also between the opposite pairs of lugs, this space being for the purpose of receiving one of the pins or teeth 105 as the pair of blocks moves from the end of one of the guides or guideways onto one of the disks 9 and 10. Each pair of blocks is connected at its opposite ends with the adjoining pairs by means of vertical hinges constituted by vertical pins 110, applied to overlapping horizontal lugs or ears 111 111, which are located at mid-width of the blocks.

It will be perceived from the foregoing that the endless feed-chain 8 comprises a series of links or blocks connected together by vertical hinges and horizontal hinges, which alternate in succession, so as to permit the chain to be bent up and down in passing onto and off the guides and also to be carried around with the disks 9 and 10 while they are engaged with the latter. The guides or guideways 11 11 throughout the greater portion of their length have their upper surfaces located higher than the surfaces of the disks 9 and 10. While the blocks travel along the main portions of the guides or guideways they are elevated above the positions which they occupy while resting on the disks. The opposite ends of the guides or guideways are sloped or inclined to enable the blocks to pass easily from the guides or guideways onto the disks and from the latter onto the guides or guideways again. The moving blocks are maintained against the surfaces of these sloping or inclined ends by overhanging portions of the table 12 at opposite ends of each guide or guideway for the blocks. (See Fig. 5.)

It will be perceived from the foregoing that the feed-chain follows a substantially horizontal course and that one portion of the endless chain 8 coöperates with one edging-saw, as 2, while the other portion thereof coöperates with the other edging-saw, as 3, the result being that the devices enable two boards to be fed simultaneously, but in opposite directions, the one feed-chain serving for both edgers. Movement of rotation is communicated to the disks 9 and 10 in suitable manner. I have herein shown the shafts 91 and 103 furnished with corresponding sprocket-wheels 112 112, which are connected by a sprocket-chain 113, another sprocket-wheel 114 being made fast on one of the said shafts in order to enable the said shaft to be rotated, movement being communicated from said shaft to the other shaft by the devices described. Above each longitudinally-extending portion of the endless feed-chain 8, adjacent to the corresponding edging-saw, is located a pair of the presser-rolls 104 104, these rolls being mounted for convenience in arms 131 131; which are pivoted at 132 132 to swing vertically, and the said arms having applied thereto weights 192 192, if necessary, to secure a proper amount of pressure. The upper surfaces of the blocks of the endless feed-chain 8 are furnished with longitudinally-extending ribs, which either are made integral with the body of each block, as shown at 116 in Figs. 6ª, 6ᵇ, and 6ᶜ, or are formed in a separate plate or block 117, which is secured by screws 118 to the body of the block, as shown in Figs. 6ᵈ and 6ᵉ. These ribs are intended to engage with the surface of a board which is passed into the machine for the purpose of being stripped or trimmed, the said ribs biting into the said surface as the board passes under the presser-rolls and acting effectively to hold the board from shifting laterally.

The material of which boxes or packing-cases are made commonly is received in the form of rough-edged boards, these latter varying somewhat in width in the course of their length in consequence of having been sawed from small timber. In edging or trimming such boards it is contemplated that only the rough, irregular, or uneven edge portions shall be taken off, and it is customary to saw closely along the edge on a straight line from one end of the board to the other, taking off only that portion of the board which is incapable of being utilized. It happens usually in practice that the boards after being edged differ in width at their opposite ends more or less. In effecting the edging the rough-edged boards are guided to the edging-saws in a position which will result in only the removal of the unserviceable edge portions thereof, the board being placed at a suitable angle with reference to the edging-saw, guided by the eye of the operative. The devices which have just been described enable each board in being fed to one of the saws to be placed on the feed-chain at any suitable inclination with respect to the plane of the saw to which it is to be fed, and as soon as the said board has passed sufficiently under the presser-rolls it is compressed onto the ribs of the blocks of the feed-chain, and thereby held in whatever position has been given to it free from all tendency to be thrust or swerved laterally.

14 designates a table or platform in line with and constituting an extension of the table 13 of the second edger, this table 14 being designed to support the boards as they pass to and between the matching-cutters, which last in accordance with my invention I place in position adjacent to the saw of the second edger. 15 and 16 are the said matching-cutters, the same being constructed in known or suitable manner to form a groove in one edge of each board and a tongue on the other edge thereof as the board passes between the said cutters, the latter acting simultaneously against the opposite edges of the board. The shaft 151 of the cutter 15 is mounted in a vertical position in fixed bearings on the framework 1 and is provided with a pulley 18 for the reception of a band, (not shown,) by means of which the shaft and cutter may be rotated. The cutter 16 is fixed on a shaft 19, that is mounted in a vertical position in bearings which are carried by a frame 20. The latter is mounted to move so that the cutter 16 may approach the cutter 15 or recede therefrom, according as a narrow board or a wide one passes between the two cutters 15 and 16 and according as a given board may vary in width at the opposite ends thereof. The importance of this capacity on the part of one of the matching-cutters to move automatically relatively to the other in conformity with variations in the widths of the boards which are received from the edging devices will be understood when it is borne in mind that not only do successive boards vary greatly from one another with respect to width, but in consequence of the mode of edging or trimming which has been described above individual boards usually are of very different widths at the two ends thereof. The construction of the said frame 20 and the manner of mounting the same may be varied in practice, it being shown herein pivoted at the end thereof which is opposite to that carrying the cutter 16. (See more particularly Figs. 1, 2, 7, and 8.) With frame 20 are combined devices acting upon the same with a tendency to bear the cutter 16 toward the cutter 15, so as to hold the said cutter 16 up against the corresponding edge of the board which is passing between the cutters. The devices which are shown herein for the purpose comprise the cord 21, the guiding-sheave 22, over which the said cord passes, and the gravitating weight 23.

34 designates a pulley on shaft 19 receiving a belt 35, which also passes around a pulley 36 on the vertical shaft 37, the latter being held in bearings 38 38 on the machine-frame and having the frame 20 swiveled thereon, so as to move as indicated above.

24 designates a fixed gage which coöperates with cutter 15 and is located adjacent to the said cutter 15 on the side of the latter from which the work advances, the said gage being secured adjustably in position on the framework 1 by means of a screw or bolt 25 passing through the slot 26 of a horizontally-projecting portion or arm 27 of the gage.

28 in Fig. 1 designates a guide or gage which is mounted on the moving frame 20 and coöperates with the cutter 16. As a board advances endwise over the table 14 its front end passes in between the gages 24 and 28, pressing back somewhat the gage 28, and consequently the moving frame 20 and its cutter 16, the proper engagement of the cutter 16 with the corresponding edge of the board being provided for thereby. For the purpose of holding down the board against the upper surface of table 14 as the board passes through between the gages 24 and 28 and the cutters 15 and 16 a presser-roll 29 is provided, it being mounted upon a shaft 30, and the said shaft being provided in practice with suitable means of driving the same. A strap or cord 31 or other convenient stop may be provided for preventing too great an extent of movement of the frame 20 and the guide and cutter carried thereby toward the opposite cutter and fixed guide or gage. The second edger and the matching devices are arranged in line with each other, so that a board in passing the edging-saw 3 advances in a direction suitable for enabling it to pass through the matching devices. As each succeeding or following board passes through the said second edger its forward end engages with the rear end of the board which has preceded it and is resting on the table 14, so that in the continued advance of the last board the first board is driven on through between the guides or gages 24 28 and also between the matching-cutters 15 and 16.

32 designates a pair of feed-rolls which is located at the delivery side of the matching-cutters, the said feed-rolls being provided in practice with suitable means of driving the same. From the matching-cutters and the feed-rolls 32 the boards pass onto a table 39, which preferably is located at a lower level than the table 14 in order that several boards may be permitted to pile one on top of another after being discharged from the feed-rolls 32. For the purpose of holding the boards in position after they have passed the feed-rolls 32 I provide side guides 40 and 41, extending across the table 39 and forming a hopper. For the support of these side guides 40 and 41 (see more particularly Fig. 9) I employ brackets 42 42, which are attached to opposite ends of the respective side guides and are bolted to the bars 43 43 at opposite sides of the table 39. In order to enable the distance between the side guides 40 and 41 to be varied when desired, in order to suit the widths of the boards being operated upon, the bolts 44 44, which clamp the brackets 42 42 to the bars 43 43, are passed through slots 45 45, extending longitudinally of the bars 43 43. The lower edges of the side guides 40 and 41 are raised sufficiently above the upper surface of table 39 to permit a board to pass beneath said edges and along the table. In connection with the table 39 I employ a transferring device for the purpose of shifting or carrying from one end of said table toward the other thereof the boards which fall from the rolls 32 onto the said table between the guides 40 and 41. This transferring device is arranged to move the said boards successively, taking each time the lowest board of the pile of boards which is between the said guides 40 and 41 and placing them side by side, properly assembled in readiness for being driven up close together, so as to cause the tongues to enter into the grooves. Herein the said transferring device is shown constituted of a pair of sprocket-chains 46 46, having secured thereto a number of transversely-extending feed-bars 47 47, which are designed to engage successively with successive boards located between the guides 40 and 41 and to push them along the surface of table 39 toward the other end of the latter. The sprocket-chains 46 46 pass over sprocket-wheels 471 471, two of which are mounted on the shaft 48, which is journaled in bearings at the receiving end of the table 39, while the other two thereof are mounted on a shaft 49, which is journaled in bearings that are located at an intermediate position in the direction of the length of the table 39. As the successive boards are passed forward by the transferring device they are pressed edgewise against the boards which have preceded them, thereby carrying the latter forward toward the gage 50, near the opposite end of table 39. After enough boards to form a box side or the like have been assembled in the foregoing manner next the gage 50 it is necessary to drive them up closely against one another, so that the tongues thereof may enter the grooves. I provide automatic means of effecting the driving, as follows: 51 designates a driver-bar which extends across the table 39, its ends resting on the side bars 52 52 of the said table or on other convenient slideways. This driver-bar is shown separately in Fig. 13. Intermediate the portions thereof which rest on the side bars 52 52 the bar 51 is cut away or elevated sufficiently to enable the boards to pass successively beneath such elevated intermediate portion, the elevation of the latter being sufficient to clear also the sprocket-chains 46 46 and the bars 47 47. The bar 51 is intended to slide upon the side bars 52 52 a certain distance lengthwise of the latter. It is held down in place by means of retaining-bars 53 53, which respectively are located above the opposite ends of the bar 51 and rest on blocks 54 54 on the said side bars 52 52.

The driver-bar 51 herein is shown operated by means of toggles, the links 55 55 of which are shown connected with the ends of the said bar and also with fixed portions of the framework, as at 56 56, the said toggles being operatively connected in the usual manner with cranks, as 57 57, on the shaft 58. The driver-bar 51 is furnished on its front or advancing side with one or more gates 59, the said gate or gates being hinged to the driver-bar, as at 60. When a board in being carried forward by a feed-bar 47 of the transferring device is pushed under the driver-bar 51, it raises the gate or gates 59 readily and passes beyond the said driver-bar without meeting obstruction from the said gate or gates; but after the board has passed, so as to permit the gate or gates to drop down under the influence of gravity or aided by the power of a spring or springs, the board cannot be forced back under the driver-bar again. Hence in the advance of the driver-bar the gate or gates thereof will engage with the rear edge of the board in front of the same and force such board forward. It is intended that the transferring device and driver-bar shall alternate in their working, also that each thereof shall be actuated automatically under the control of an attendant upon the machine. The transferring device is caused by the operator to operate until the desired number of boards has been assembled edge to edge on the table 39, adjacent the gage 50. Then the transferring device is rendered inoperative by the operator and the driver-bar is caused to move forward, so as to compress the assemblage of boards between itself and the gage 50. Meanwhile the boards advancing from the matching devices will accumulate in a pile between the side guides 40 and 41. Then the transferring device will be thrown into operation again after the assembled and driven-up boards have been drawn off the table 39, and the operations will be repeated. The transferring device will operate with such rapidity as quickly to assemble next the gage 50 the number of boards which is necessary to make up the required width of a box side or the like.

In order to provide conveniently for working the driver-bar and the transferring device alternately under the control of the attendant, I have shown the following arrangement of driving devices: 601 designates a suitable driving-shaft, having band-pulleys or sprocket-wheels 61 and 62 mounted loosely thereon, and also having splined thereon between the said loose pulleys or wheels a clutching-disk 63, which is provided with pins 631 631, as shown, or other engaging devices, that are arranged to engage with the said pulleys or wheels when desired. On the shaft 49, carrying two of the sprocket-wheels 471 471, is made fast a band-pulley or sprocket-wheel 64, receiving a band or link chain 65 from the pulley or wheel 61 on the shaft 601. On the crank-shaft 58, which actuates the toggles connected with the driver-bar 51, is made fast a band-pulley or sprocket-wheel 66, receiving a driving-band or link chain 67 from the pulley or wheel 62 on the driving-shaft 601. By causing the clutch-disk 63 to engage with the pulley or wheel 61 motion may be communicated from the driving shaft 601 to the shaft 49, and thereby the transferring device will be actuated. By shifting the clutch-disk 63 over, so as to become engaged with the pulley or wheel 62, the transferring device will be caused to come to rest, while the crank-shaft 58 will be rotated and the driver-bar 51 will be actuated therefrom. By shifting the clutch-disk 63 into an intermediate position it will be disengaged from both of the pulleys or wheels 61 and 62, and in this case both the transferring device and the driver-bar will be left at rest. For the purpose of enabling the clutch-disk 63 to be operated by an attendant I have provided in the machine which is shown in the drawings a lever 671, which is caused to engage with the said clutch-disk by its forked end, the said lever 671 being connected by a rod 68 to the hand-lever marked 69.

For the purpose of preventing the boards from buckling up as they are being driven together by the driver-bar 51 I provide hold-down devices 70 70, Figs. 1, 3, 10, and 11, which are shown herein as constituted by bars extending lengthwise of the table 39, two of the said bars being shown herein for convenience bolted to driver-bar 51 and two bolted to the gage 50.

The boards after being trimmed vary greatly in width. Consequently it is necessary to make the gage 50 yielding, so as to accommodate or compensate for differences in the widths of successive sets of boards assembled on the table 39 between the driver-bar 51 and the said gage 50. Thus I have shown herein between the said gage 50 and a cross-bar 71, which is fixed in position on the table 39, a series of springs 72 72, Figs. 1, 3, 10, and 11, the said springs surrounding bolts 73, which are fixed to the said gage 50. The said bolts slide through holes which are provided therefor in the bar 71. The said springs 72 72 hold the gage 50 normally pressed into the position which is determined by the contact of the nuts 74 or equivalent stops on the bolts 73 73 with the rear side of the fixed bar 71, the said springs being sufficiently stiff to hold the gage up to its work while a series of boards is being compressed edgewise against the gage by the action of the driver-bar 51, but yielding to accommodate any excess in the width of the assembled series of boards. In order to provide for the production of box sides or the like of different widths, the gage 50 is made adjustable toward and from the driver-bar. To this end a series of holes 75 75 is provided either in each of the side bars 52 52 of the table 39 or in a bar or strip 76, which is secured to each of the said side bars, and pins or bolts 77 77 are passed through holes 78 78 at the opposite ends of the bar 71 into the desired pair of the holes 75 75. The holes 75 75 of each series are located at a convenient distance apart; but in order to provide for making a finer adjustment of the position of the gage a number of holes 78 78— three, for instance—is formed in each end of bar 71 in a series which is inclined with respect to the length of the said bar 71. In making use of the different holes 78 78 of these two inclined series of holes in the bar 71 the said bar is shifted longitudinally to a slight extent, as well as forwardly or backwardly, in transferring the pin or bolt 77 at each end of bar 71 from one hole 78 to another of the inclined series at such end.

After the assembled boards have been driven together they are moved transversely off the table 39 and are trimmed to the width of the desired box side or other article.

For trimming the box side to the proper width I employ a saw at 79, mounted on a shaft at 80, which shaft is provided with a band-pulley at 81, by means of which the shaft and saw may be driven. The gage 50 acts in connection with this saw to determine the width of the box side. At each advance of the driver-bar 51 the spring-backed gage 50 is pressed somewhat out of its normal position; but before the assembled boards constituting the box side which have been compressed together by the advance of the driver-bar 51 are fed forward to the saw 79 the driver-bar 51 recedes, thereby allowing the springs 72 72 to force the gage 50 back into its normal position. The assembled boards may be pushed past the saw 79 by a workman; but preferably for the purpose of feeding the same automatically I employ a pair of feed-rolls 84 in advance of the said saw—that is, between the saw and the table 39—and a second pair of feed-rolls 85 on the delivery side of the saw, these two pairs of feed-rolls being provided with usual means of driving the same, not necessary to be shown herein. Between the said two pairs of feed-rolls is located an extension, as 82, of the gage 50. Preferably the said two pairs of feed-rolls—or it might be simply the pair 84—are set at a slight inclination with respect to the gage 50 and its extension 82, so that they tend to carry the one edge of the assembled series of boards toward the said gage, and thereby insure the contact of said edge with the gage.

The assembled series of boards resting on the table 39 after having been compressed by the action of the driver-bar may be started in between the feed-rolls 84 by being pushed by the pressure of a workman's hand or hands, he standing at the front of the table 39 in Fig. 3. Preferably, however, in order to enable the said series to be moved into the bite of the said feed-rolls by a workman standing at a distance I provide a mechanical pusher, comprising a bar, as 1181, which is connected by one or more rods, as 119, to a swinging arm or lever, as 120, having connected therewith a rod, as 121, extending to the point where it is desired to place the workman who is required to work the said pusher. This point may be, for instance, that which is indicated at X X X in Fig. 1. It will be observed that the hand-lever 69 is located at this point in order to enable the same workman also to control the working of the transferring device and of the driver-bar. In order to enable the pusher and its operating devices to be adjusted to suit the length of the boards which are resting on the assembling-table, the rod or rods 119 are provided with a series of holes 179, as shown in Fig. 14, to enable the pusher to be set at any required distance from the arm or lever 120.

Beyond the saw 79 and its feed-rolls is located the table 86, onto which latter the box side is passed after having been trimmed to the proper width. At opposite ends of this table are located the shafts 87 and 88, each carrying a pair of sprocket-wheels 89 89. 90 90 are sprocket-chains located at the opposite sides of the table 86 and passing around the sprocket-wheels 89 89 on the shafts 87 88, as shown. These chains carry lugs 91 91, projecting upwardly into position to engage with one edge of the box side which is resting on the table 86, so that the movement of the chain operates through the engagement of the lugs 91 91 with the box side to feed the box side transversely with reference to its width on the table 86. For the purpose of operating the chains one of the shafts, as 87, has made fast thereon a band-pulley or sprocket-wheel 92, receiving a band or link chain 93 from a loose pulley or sprocket-wheel 94 on a rotating shaft, as 601. 95 is a suitable clutch device splined to the shaft 601 and adapted for engagement with the loose pulley or sprocket-wheel 94, and 96 is a lever by means of which the clutch device 95 may be operated, the said lever being located near the point X X X, so as to enable it to be operated by the same workman who controls the working of the transferring device and driver-bar and operates the pusher 1181. After a box side has been trimmed to width by the saw 79 and passed forward onto the table 86 the lever 96 is operated to cause the clutch device 95 to engage with the pulley or sprocket-wheel 94, which throws the chains into action. Through the engagement of the lugs 91 91 with the edge of the box side the movement of the chains feeds the box side transversely past the two saws 97 98, which trim the ends of the box side and give the latter the proper length. The said saws 97 98 are mounted on a shaft or arbor 99, which latter is provided with a suitable band-pulley 100 for the purpose of enabling the shaft and saws to be rotated. The saw 97 is applied to a saw-clamping collar 101 of well-known construction, (see Fig. 15,) the said collar being mounted on the shaft or arbor 99 with capacity to be moved endwise along the said shaft for the purpose of enabling the saw 97 to be set at the proper distance from the saw 98 to give the desired length of box side, the said collar being secured in the desired position of adjustment by means of a clamping-screw 102 or other suitable device. The sprocket-wheels 89 89 on the same side of table 86 with the said saw 97 are adapted to be shifted lengthwise of their shafts 87 88, the adjustment of such sprocket-wheels being provided for in suitable manner—as, for example, by applying splines 891 891 to the said shafts and providing the hubs of the sprocket-wheels with clamping-screws 892 892. In order to permit the adjustment of the said sprocket wheels and chain transversely of table 86, the boarding constituting the top of the said table is made removable, (see Figs. 4 and 12,) each board being provided with one or more depending pins, as 861 861, entering holes which are formed in the cross-girths 862 862. Each board also is provided with a longitudinally - extending groove 863, in which the chain may run. The removal of the board next the adjustable saw and sprockets enables these parts and the corresponding sprocket-chain to be set over nearer to the parts at the other side of the table.

I claim as my invention—

1. The combination with the edging-saws 2 and 3 located opposite to each other, of the feed-chain composed of links jointed together to permit swinging movements of the said links in planes at right angles to each other, the said feed-chain following a substantially horizontal course, with one length thereof traveling in one direction past the one saw, and the other length thereof traveling in the other direction past the other saw, means to actuate the said chain, and means to guide the chain arranged to carry its return-bends below the level of the portions thereof which are adjacent the saws, substantially as described.

2. The combination with the edging-saws 2 and 3, located opposite to each other, of the feed-chain following a substantially horizontal course, with one length thereof traveling in one direction past the one saw and the other length thereof traveling in the other direction past the other saw, the guides for the said feed-chain having the horizontal surfaces and the downwardly-inclined opposite ends alongside the respective saws, and the wheels or disks located between the said downwardly-inclined ends and around which the said feed-chain passes and by means of which it is actuated, substantially as described.

3. The combination with the edging-saws 2 and 3, of the endless feed-chain having one length thereof arranged to travel in one direction past the one saw and the other length thereof arranged to travel in the other direction past the other saw, the said chain having work-supporting surfaces at right angles to the planes of the saws and lateral to the bight of the chain, and pressers coöperating with each of the said lengths of the feed-chain, the work-supporting surfaces of the links or blocks composing the feed-chain having projecting portions onto which the boards are forced by the pressers and which bite into the boards to hold the latter from lateral shift after entering between the feed-chain and the pressers, substantially as described.

4. The combination with the feed-chain composed of blocks hinged or jointed together, of the two guides or guideways having the horizontal surfaces along which said blocks travel while in engagement with the boards which are being fed and the downwardly-inclined ends, the wheels or disks at the opposite ends of the said guides or guideways between the said downwardly-inclined ends of the guides or guideways and around which the said blocks travel in passing from one guide or guideway to the other, and means to hold a board in engagement with the blocks while traveling along each of the guides or guideways, whereby to feed two boards simultaneously but in opposite directions, substantially as described.

5. In combination, the saw 2 for edging one edge of a board; the saw 3 located in a plane parallel to said first saw and adjacent thereto for edging the other edge of a board; a traveling carrier to engage the surface of the board and carry it past the first saw at any required angle of inclination, said carrying device serving also to return the said board past the second saw in like manner, whereby the trimming of the edges of said board may be effected at any required angle relative to its longitudinal axis; matching-cutters in line with the said second saw to receive the boards fed forward therefrom; a support for one of said cutters; and means to cause said last-named cutter to move automatically to accommodate itself to variations in the widths of the boards.

6. The combination with the edging-saws 2 and 3 located opposite to each other, of the feed-chain having one length thereof arranged to travel in one direction past one saw and the other length thereof arranged to travel in the other direction past the other saw, whereby to feed two boards simultaneously to the two saws but in opposite directions, means to operate and guide the said feed-chain, and the matching - cutters receiving the boards from the second saw, and serving to simultaneously tongue and groove the opposite edges thereof, substantially as described.

7. The combination with means for edging boards, and the matching devices receiving the boards after having the edges thereof stripped or trimmed by the edging means, and operating to tongue and groove the opposite edges of each board, of the assembling-table, and means to assemble automatically the matched boards on said table edge to edge, substantially as described.

8. The combination, in an organized machine, with the two edgers, and the matching devices receiving the boards after having both edges thereof stripped or trimmed by the said edgers, and operating to simultaneously tongue and groove the opposite edges of each board, of the assembling-table, and means to assemble the matched boards on said table, edge to edge, and drive them up to cause the tongues to enter fully into the grooves, substantially as described.

9. The combination, in an organized machine, with the two edgers, and the matching devices receiving the boards after having both edges thereof stripped or trimmed by the said edgers, and operating to simultaneously tongue and groove the opposite edges of each board, of the assembling-table, the transferring device to transfer and assemble the matched boards, edge to edge, on the said table, the driver to drive up the boards to cause the tongues to enter fully into the grooves, and mechanism under the control of an attendant for working the said transferring device and driver, respectively, substantially as described.

10. The combination with a table, means to position a supply of matched boards, a gage, a transferring device for moving the said boards successively and assembling them edge to edge against the said gage, a driver for driving up the said boards to cause the tongues thereof to enter the grooves thereof, and mechanism under the control of an attendant for working the said transferring device and driver, substantially as described.

11. The combination with a table, a guide or guides to retain in place a pile or stack of matched boards, a yielding gage applied to the said table, a transferring device for moving the said boards successively and assembling them edge to edge against the said gage, a driver for driving up the said boards against the said gage to cause the tongues to enter fully into the grooves, and mechanism under the control of an attendant for working the said transferring device and driver, substantially as described.

12. The combination with a table, a gage applied thereto, devices for assembling a series of matched boards edge to edge against the said gage and driving them up to cause the tongues to enter fully into the grooves, and a saw cutting in a plane parallel with the said gage for trimming the assembled series of boards to the desired width of a box side, substantially as described.

13. The combination with the assembling-table, the gage applied thereto, the devices under the control of an attendant for assembling a series of matched boards edge to edge against the said gage and driving them up to cause the tongues to enter fully into the grooves, a saw cutting in a plane parallel with the said gage for trimming the assembled series of boards to the desired width of a box side, and feeding devices whereby the said series is fed past the said saw, substantially as described.

14. The combination with the assembling-table, the gage applied thereto, the devices under the control of an attendant for assembling a series of matched boards edge to edge against the said gage and driving them up to cause the tongues to enter fully into the grooves, the saw cutting in a plane parallel with the said gage for trimming the assembled series of boards to the desired width of a box side, and the saws for trimming the said series to the desired length of the box side, substantially as described.

15. The combination in an organized machine for making box sides and the like articles, with edging devices for stripping or trimming the edges of the boards, matching devices to which the trimmed boards are fed automatically and whereby the opposite edges thereof simultaneously are tongued and grooved, devices whereby the matched boards are assembled together edge to edge and driven up to cause the tongues to enter fully into the grooves, a saw cutting in a plane parallel with the said gage for trimming the assembled series of boards to the desired width of a box side, the saws for trimming the series to the desired length, and devices for feeding the said series to the respective saws, substantially as described.

16. The combination with the assembling-table, a guide or guides to retain a stack or pile of matched boards in place, a gage, a transferring device for moving the said boards successively and assembling them edge to edge against the gage, a driver-bar past which the transferring device operates, means to reciprocate the driver-bar, and one or more movable drivers applied to the said driver-bar, yielding in one direction to permit the advance of the boards and the transferring device but firm in the other direction to effect the driving up when the driver-bar is advanced, substantially as described.

17. The combination with the saws 97 and 98, their shaft or arbor, the shafts 87 and 88, the pairs of sprocket-wheels thereon, the sprocket-chains 89, 90, and the table 86 having the covering of removable boards each having the groove or passage-way for a sprocket-chain, whereby to permit the saw, sprocket-wheels, and sprocket-chain at one side of the table to be set at the required distance from the corresponding parts at the other side thereof, substantially as described.

In testimony whereof I affix my signature in presence of two witnesses.

FRANK P. CHENEY.

Witnesses:
CHAS. F. RANDALL,
LEPINE HALL RICE.

It is hereby certified that in Letters Patent No. 725,930, granted April 21, 1903, upon the application of Frank P. Cheney, of Lowell, Massachusetts, for an improvement in "Machines for Making Sides for Packing-Cases," an error appears in the printed specification requiring correction, as follows: In lines 34-5, page 7, the words "and the downwardly-inclined opposite ends" should be stricken out and inserted after the word "saws" in line 35, same page; and that the said Letters Patent should be read with this correction therein that the same may conform to the record of the case in the Patent Office.

Signed and sealed this 5th day of May, A. D., 1903.

[SEAL.]

F. I. ALLEN,
*Commissioner of Patents.*